No. 824,445. PATENTED JUNE 26, 1906.
S. SCOTT.
MOLD USED IN THE MANUFACTURE OF SHORT BREAD AND SIMILAR CAKES.
APPLICATION FILED JULY 2, 1904.
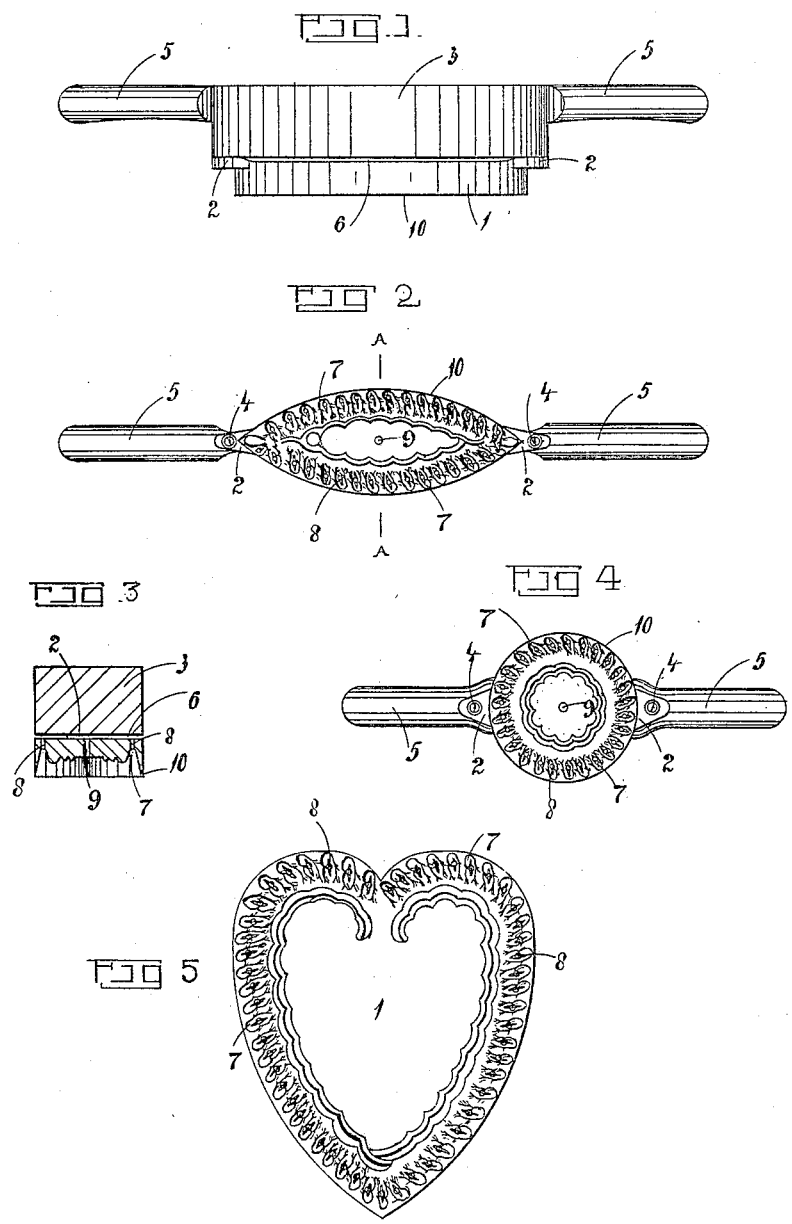
Witnesses.
E. P. O'Donnell
A. Wilson
Inventor
Simon Scott
by his Attorney
Henri H. Rayward

UNITED STATES PATENT OFFICE.

SIMON SCOTT, OF WELLINGTON, NEW ZEALAND.

MOLD USED IN THE MANUFACTURE OF SHORT-BREAD AND SIMILAR CAKES.

No. 824,445.  Specification of Letters Patent.  Patented June 26, 1906.

Application filed July 2, 1904. Serial No. 215,136.

*To all whom it may concern:*

Be it known that I, SIMON SCOTT, a subject of His Majesty the King of Great Britain and Ireland, residing at 127 Cuba street, Wellington, in the Provincial District of Wellington, in the Colony of New Zealand, have invented new and useful Improvements in Molds Used in the Manufacture of Short-Bread and Similar Cakes, of which the following is a specification.

By means of this invention dough is cut into shapes and molded at one operation to resemble hand-made cakes.

In this specification the invention is described as applied to the making of cakes of short-bread. The mold proper is made of metal, preferably gun-metal, for facility of manufacture and durability. The pattern of the mold is the obverse of the shape desired for the cake. The mold is mounted upon a block having two handles, which the operator grasps. Ears upon the mold separate the block from the mold, leaving a space corresponding to the length and width of the mold for air, which escapes through holes in the back of the mold during the operation of impressing the dough. Cells forming part of the pattern of the mold are shaped to imitate the crimping accomplished by the thumb and finger of an operator making cakes by hand.

The drawings illustrate the invention.

Figure 1 is a side elevation; Fig. 2, a plan of the interior, and Fig. 3 a cross-section on line A A of the mold. Fig. 4 is a plan of another shape, and Fig. 5 a similar view of another shape of mold.

The mold proper, 1, has ears 2, extending from and raised higher than the back of the mold and is mounted upon a block 3 by screws 4, which pass through the said ears. The block has handles 5, which are grasped by the operator. A space 6, corresponding to the length and width of the mold, is left between the mold 1 and the block 3. Cells 7 are made in the pattern of the mold to correspond to the shape of the crimping effected by the thumb and finger on a hand-made cake. A hole 8 is provided in the bottom of each cell 7 for the escape of air from the cell to the space 6, and a hole 9 is made in the center of the mold for a similar purpose. The rim 10 terminates in a knife-edge.

The dough is rolled out on a table until it has a thickness corresponding to the depth of the pattern of the mold, which is then taken by the handles and pressed into the dough. The air confined between the dough and the mold escapes through the holes 8 and 9 into the space 6 and thence to the atmosphere. The rim 10 cuts the dough into shape, and in this manner the shape and pattern are produced at one operation.

Having now particularly described and ascertained the nature of my said invention and in what manner the same is to be performed, I declare that what I claim is—

For the purpose indicated in combination, a mold having cells each provided with a hole for the escape of air a rim forming a border to the mold and having a knife-edge, a back upon which the mold is mounted, ears extending from and raised above the back of the mold for attaching the mold to the back and for providing an air-space between and extending throughout the length and width of the mold and back, substantially as set forth.

In testimony whereof I have signed my name to this specification in the presence of two witnesses.

SIMON SCOTT.

Witnesses:
HENRIE H. RAYWARD,
E. P. O'DONNELL.